United States Patent
Yun et al.

(10) Patent No.: US 11,495,167 B2
(45) Date of Patent: Nov. 8, 2022

(54) INFINITELY EXPANDABLE DISPLAY DEVICE

(71) Applicant: LG Display Co., Ltd., Seoul (KR)

(72) Inventors: Jun Woo Yun, Goyang-si (KR); Tae Gung Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/519,184

(22) Filed: Nov. 4, 2021

(65) Prior Publication Data

US 2022/0198993 A1    Jun. 23, 2022

(30) Foreign Application Priority Data

Dec. 21, 2020  (KR) .......... 10-2020-0179610

(51) Int. Cl.
   *G09G 3/20*      (2006.01)
   *G09G 3/3233*    (2016.01)
   *G09G 3/3275*    (2016.01)

(52) U.S. Cl.
   CPC ......... *G09G 3/2096* (2013.01); *G09G 3/3233* (2013.01); *G09G 3/3275* (2013.01);
   (Continued)

(58) Field of Classification Search
   CPC .. G09G 3/2096; G09G 3/3233; G09G 3/3275; G09G 2300/026;
   (Continued)

(56) References Cited

U.S. PATENT DOCUMENTS 6,731,276 B1 *  5/2004 Ishizuka .............. G09G 3/3266
                                              315/169.3
2006/0125807 A1 *  6/2006 Park ..................... G09G 3/3233
                                              345/204
(Continued)

FOREIGN PATENT DOCUMENTS

EP    1 7807 02 A1   5/2007
EP    3316241 A1     5/2018
(Continued)

OTHER PUBLICATIONS

Extended European Search Report dated Apr. 29, 2022, issued in corresponding European Patent Application No. 21207866.1.

*Primary Examiner* — Tom V Sheng
(74) *Attorney, Agent, or Firm* — Morgan, Lewis & Bockius LLP

(57) ABSTRACT

An infinitely expandable display device according to an embodiment of the present disclosure includes a plurality of display units including a plurality of data drivers connected through a bidirectional interface circuit, and a timing controller commonly connected to the display units through the bidirectional interface circuit. Each of the data drivers includes a first reception circuit configured to receive a first interface signal in a first direction, a first transmission circuit configured to transmit the first interface signal in the first direction, a second reception circuit configured to receive a second interface signal in a second direction opposite the first direction, a second transmission circuit configured to transmit the second interface signal in the second direction, and a switch circuit SWP connected to the first transmission circuit, the second transmission circuit, and the second reception circuit.

13 Claims, 14 Drawing Sheets

(52) U.S. Cl.
CPC ............... *G09G 2300/026* (2013.01); *G09G 2300/0426* (2013.01); *G09G 2300/0842* (2013.01); *G09G 2310/08* (2013.01)

(58) Field of Classification Search
CPC ... G09G 2300/0426; G09G 2300/0842; G09G 2310/08; G09G 2360/04; G09G 2370/08; G09G 2370/10; G06F 3/1446
USPC .......................................................... 345/214
See application file for complete search history.

(56) References Cited

U.S. PATENT DOCUMENTS

| | | | |
|---|---|---|---|
| 2007/0091059 A1 | 4/2007 | Kang | |
| 2009/0278985 A1* | 11/2009 | Chan | G06F 3/1446 348/554 |
| 2013/0222360 A1* | 8/2013 | Tsai | G06F 3/1446 345/213 |
| 2014/0286634 A1* | 9/2014 | Tsuiki | H04B 10/032 398/5 |
| 2015/0097916 A1* | 4/2015 | Epstein | G06F 3/147 348/14.02 |
| 2015/0325193 A1* | 11/2015 | Chang | G09G 5/001 345/698 |
| 2016/0019831 A1 | 1/2016 | Hall et al. | |
| 2018/0006101 A1 | 1/2018 | Ha et al. | |
| 2018/0046424 A1* | 2/2018 | Jo | G09G 3/2096 |
| 2018/0129462 A1* | 5/2018 | Han | H04N 5/445 |
| 2019/0286404 A1* | 9/2019 | Momose | G09G 5/00 |

FOREIGN PATENT DOCUMENTS

| | | |
|---|---|---|
| KR | 10-0728007 B1 | 6/2007 |
| KR | 10-2012-0074517 A | 7/2012 |
| KR | 10-2013-0056776 A | 5/2013 |
| KR | 10-2018-0032738 A | 4/2018 |

* cited by examiner

| Classification | Resolution Vertical x Horizontal | Remark |
|---|---|---|
| Panel Unit | 480 X 270 | ASIC driving minimum unit |
| Cabinet | 1920 X 1080 | Set driving unit (16 units) |

INFINITELY EXPANDABLE DISPLAY DEVICE

This application claims the benefit of Korean Patent Application No. 10-2020-0179610, filed on Dec. 21, 2020, which is hereby incorporated by reference as if fully set forth herein.

BACKGROUND

Technical Field

The present disclosure relates to an infinitely expandable display device having expandability.

Discussion of the Related Art

Recently, large displays have been used in various fields such as indoor and outdoor digital advertisements. To meet the demand for large displays, a display device having expandability is proposed. An infinitely expandable display device forms a screen by connecting a plurality of display units and has the advantage that the screen size can be increased as necessary.

However, each display unit of an infinitely expandable display device includes a control printed circuit board and an application-specific integrated circuit mounted thereon, and thus a connection structure of display units is complicated and an additional data processing operation for image synchronization is required.

SUMMARY

Accordingly, embodiments of the present disclosure are directed to an infinitely expandable display device that substantially obviates one or more of the problems due to limitations and disadvantages of the related art.

As aspect of the present disclosure is to provide an infinitely expandable display device capable of simplifying a connection structure of display units and a data processing operation.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, an infinitely expandable display device comprises a plurality of display units including a plurality of data drivers connected through a bidirectional interface circuit, and a timing controller commonly connected to the display units through the bidirectional interface circuit. Each of the data drivers includes a first reception circuit configured to receive a first interface signal in a first direction, a first transmission circuit configured to transmit the first interface signal in the first direction, a second reception circuit configured to receive a second interface signal in a second direction opposite the first direction, a second transmission circuit configured to transmit the second interface signal in the second direction, and a switch circuit connected to the first transmission circuit, the second transmission circuit, and the second reception circuit.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles.

DETAILED DESCRIPTION

Figure 1:
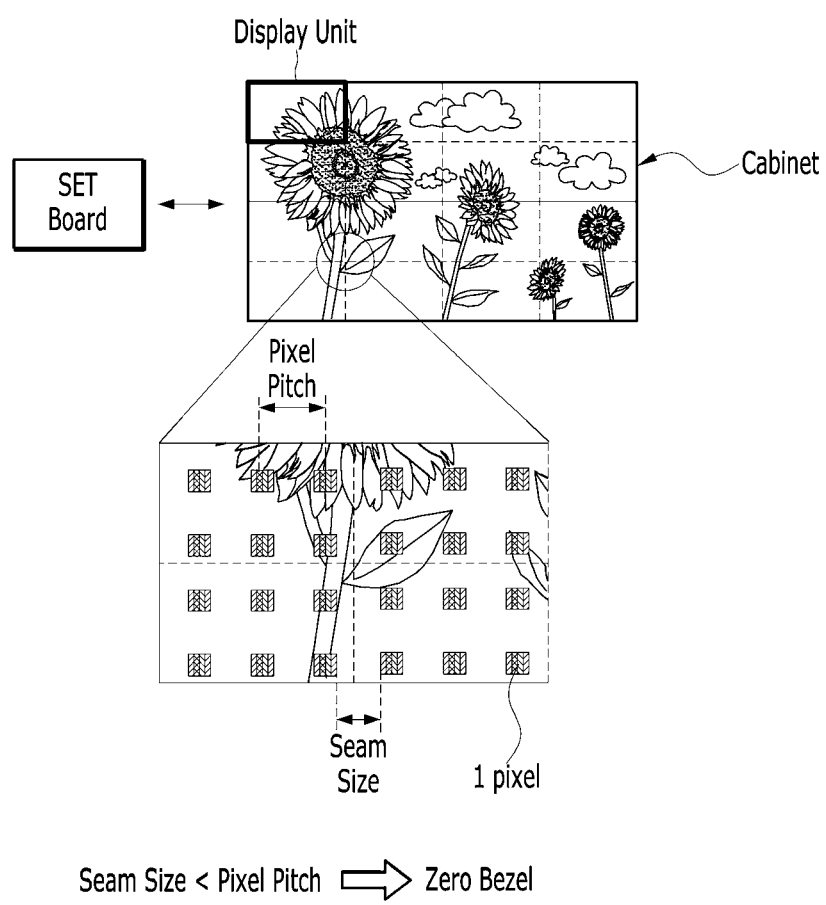
FIG. 1 is a diagram schematically showing an infinitely expandable display device according to an embodiment of the present disclosure.

The advantages and features of the present disclosure and the way of attaining the same will become apparent with reference to embodiments described below in detail in conjunction with the accompanying drawings. The present disclosure, however, is not limited to the embodiments disclosed hereinafter and may be embodied in many different forms. Rather, these exemplary embodiments are provided so that this disclosure will be through and complete and will fully convey the scope to those skilled in the art. Thus, the scope of the present disclosure should be defined by the claims.

The shapes, sizes, ratios, angles, numbers, and the like, which are illustrated in the drawings in order to describe embodiments of the present disclosure, are merely given by way of example, and therefore, the present disclosure is not limited to the illustrations in the drawings. The same elements are designated by the same reference numerals throughout the specification. In the present disclosure, when the terms "comprise", "include", and the like are used, other elements may be added unless the term "only" is used. An element described in the singular form is intended to include a plurality of elements unless the context clearly indicates otherwise.

In the interpretation of constituent elements included in the various embodiments of the present disclosure, the constituent elements are interpreted as including an error range even if there is no explicit description thereof.

When describing positional relationships, for example, when the positional relationship between two parts is described using "on", "above", "below", "beside", or the like, one or more other parts may be located between the two parts unless the term "directly" or "closely" is used.

In the description of the various embodiments of the present disclosure, although terms such as "first" and "second" may be used to describe various elements, these terms are merely used to distinguish the same or similar elements from each other. Therefore, in the present disclosure, an element modified by "first" may be the same as an element modified by "second" within the technical scope of the present disclosure unless otherwise mentioned.

Hereinafter, embodiments of the present disclosure will be described in detail with reference to the attached drawings. In the following description, if a detailed description of known techniques associated with the present disclosure would unnecessarily obscure the gist of the present disclosure, detailed description thereof will be omitted.

Figures 2, 3:
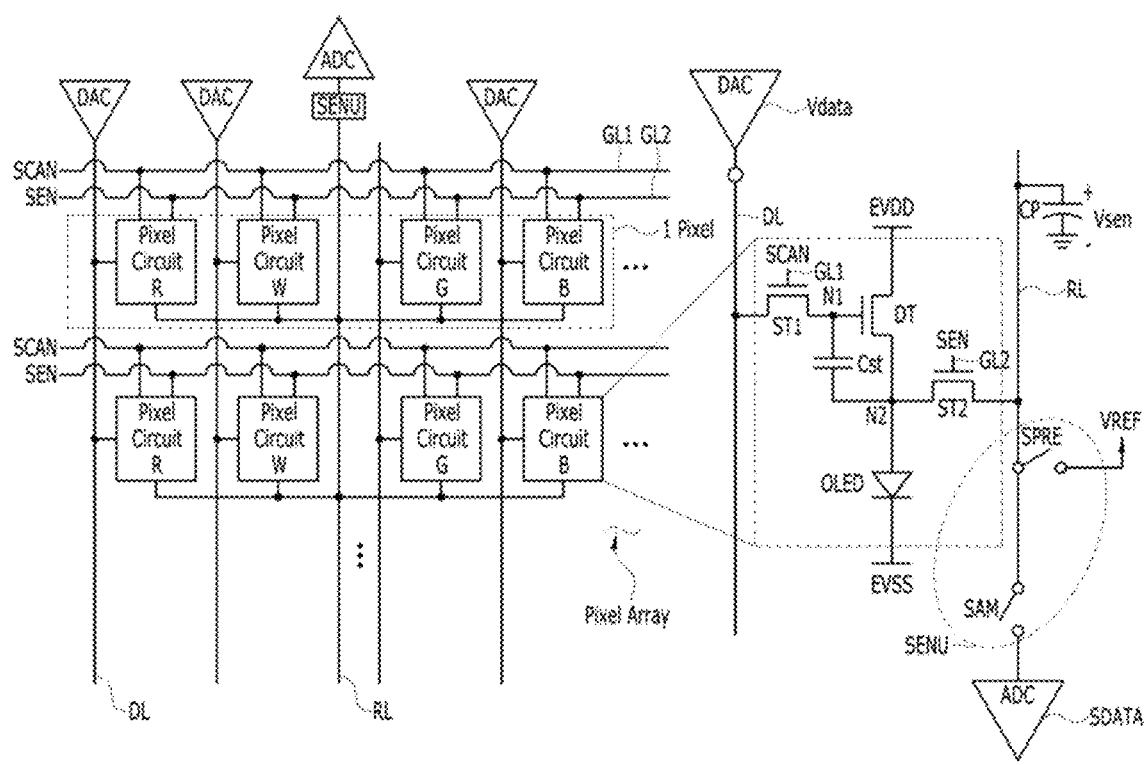
FIG. 2 is a diagram showing exemplary resolution according to a driving unit of the infinitely expandable display device shown in FIG. 1.
FIG. 3 is a diagram showing a configuration of a display unit in the infinitely expandable display device.
Figure 4:
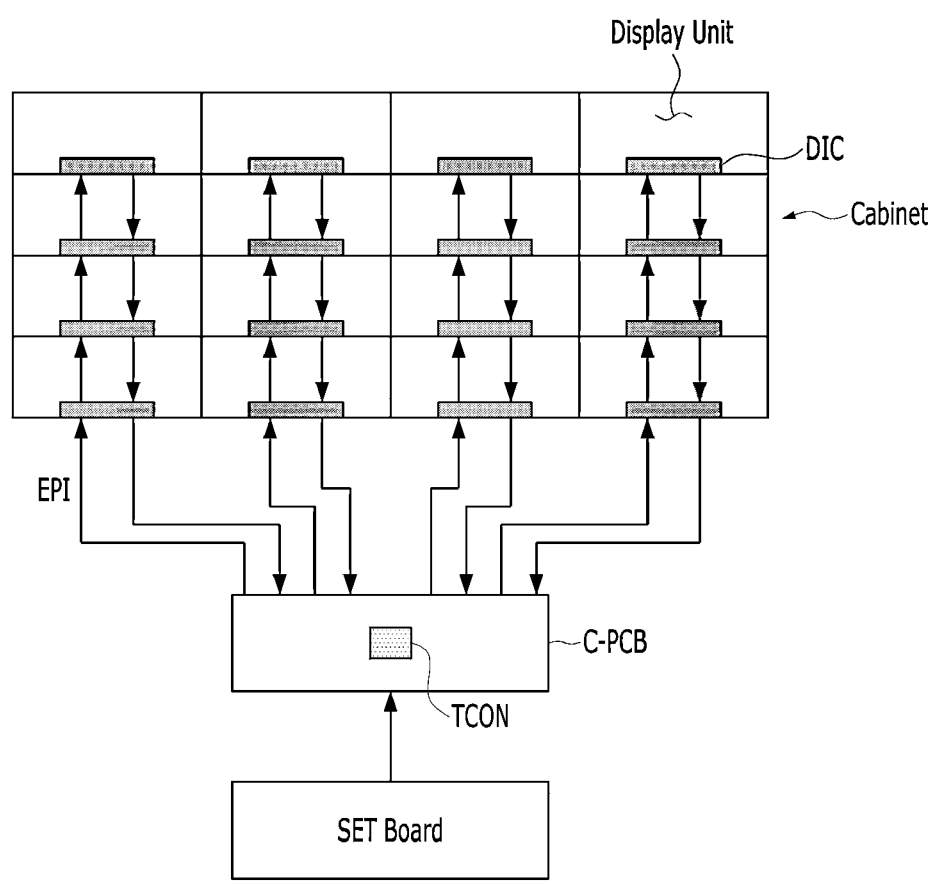
FIG. 4 is a diagram showing that data drivers of display units are commonly connected to a single control printed circuit board.
Figure 5:
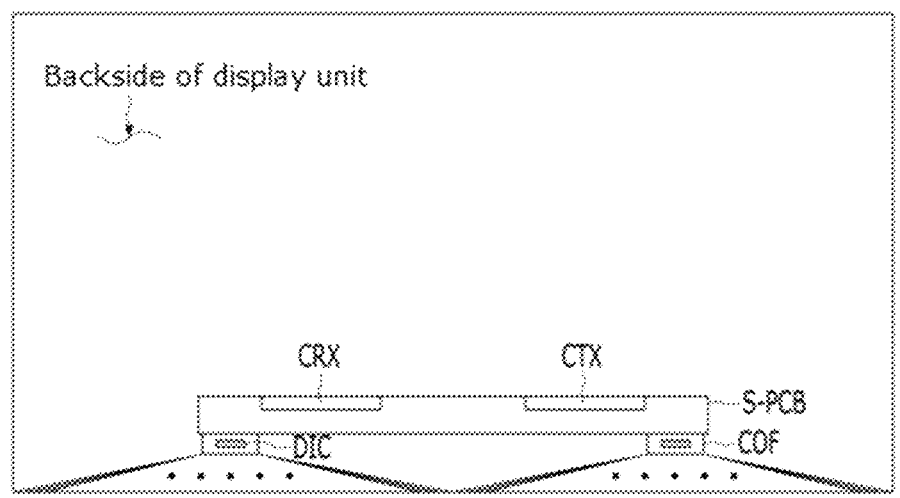
FIG. 5 is a diagram showing a configuration of connection between data drivers and peripheral circuits in display units.
Figure 6:
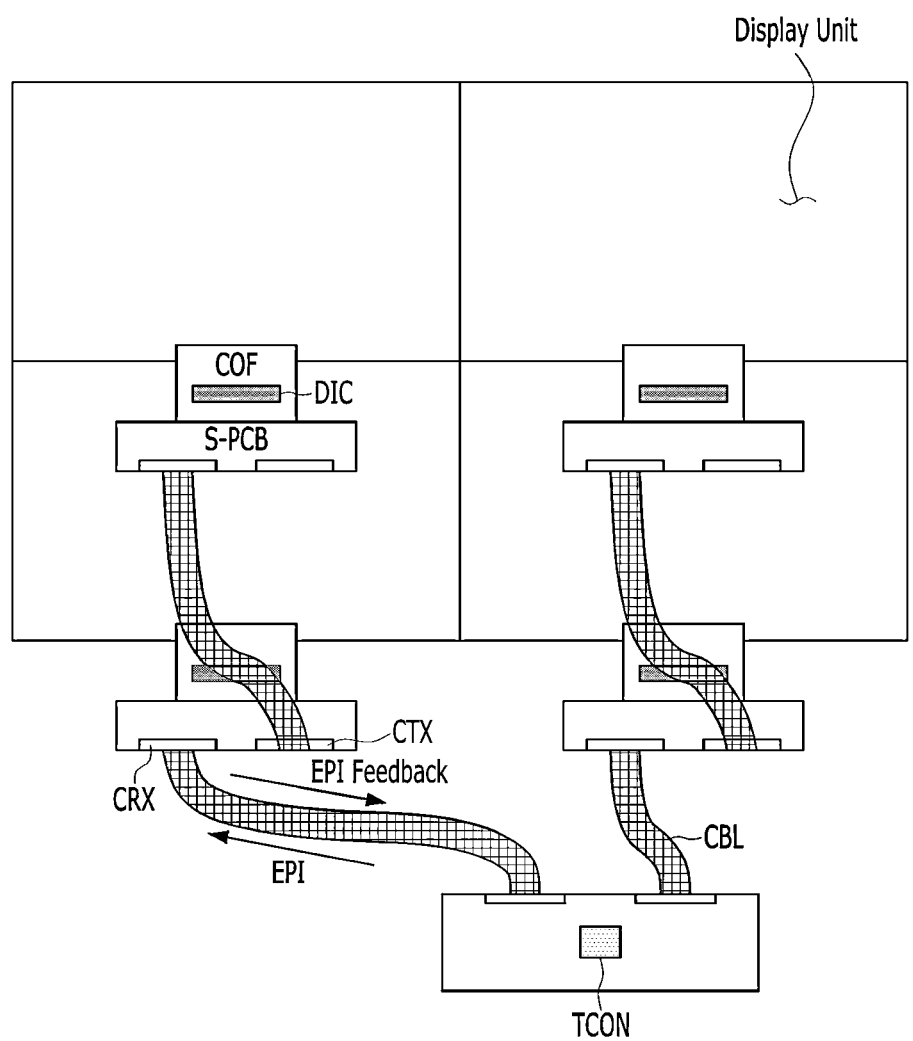
FIG. 6 is a diagram showing a configuration of connection between a timing controller and display units through connection cables.

FIG. 1 is a diagram schematically showing an infinitely expandable display device according to an embodiment of the present disclosure. FIG. 2 is a diagram showing an exemplary resolution according to a driving unit of the infinitely expandable display device shown in FIG. 1. FIG. 3 is a diagram showing a configuration of a display unit in the infinitely expandable display device. FIG. 4 is a diagram showing that data drivers of display units are commonly connected to a single control printed circuit board. FIG. 5 is a diagram showing a configuration of connection between a data driver and peripheral circuits in a display unit. FIG. 6 is a diagram showing a configuration of connection between a timing controller and display units through connection cables.

Referring to FIG. 1, the infinitely expandable display device according to an embodiment of the present disclosure includes a set board and a cabinet.

The cabinet includes a plurality of display units connected through a bidirectional interface circuit to construct a screen. The full resolution of the large screen is determined by the sum of unit resolutions of the display units. For example, if the cabinet is composed of 16 display units having a unit resolution of 480*270, as shown in FIG. 2, the full resolution of the cabinet is 1920*1080.

The display units may be implemented as an electroluminescent display type capable of sensing driving characteristics of pixels. However, the technical spirit of the present disclosure is not limited to the method of implementing the display units.

A gap (i.e., seam size) between the display units is designed to be less than a gap between pixels (i.e., pixel pitch) in order to achieve zero bezel. The zero bezel improves visibility and readability of the screen.

The display units are connected through a cascading internal interface circuit to sequentially transfer image data generated in the set board. Each display unit corresponds to an electroluminescent display device including a display panel in which pixels are formed and a panel driving circuit for driving the display panel. The panel driving circuit includes a data driver and a gate driver.

A pixel array as shown in FIG. 3 is formed on the front side of the display panel. The pixel array may include a plurality of sub-pixels and signal lines for supplying a driving voltage to the plurality of sub-pixels. These signal lines may include data lines DL for transmitting data voltages Vdata, gate lines GL1 and GL2 for transmitting gate signals SCAN and SEN, and readout lines RL for supplying a reference voltage VREF and sensing pixel driving characteristics Vsen. In addition, the signal lines disposed in the pixel array may further include a driving voltage line for transmitting a high-level pixel voltage EVDD. The data lines DL and the readout lines RL may extend in a first direction on the pixel array and the gate lines GL1 and GL2 may extend in a second direction perpendicular to the first direction. These signal lines may be connected to a pixel circuit of each sub-pixel and connected to the panel driving circuit. A low-level pixel voltage EVSS may be supplied to the pixel array. Here, the low-level pixel voltage EVSS may be a common voltage applied to all sub-pixels. The low-level pixel voltage EVSS may be applied as a higher voltage in a sensing mode for driving characteristic detection than in a display mode for image writing, but the present disclosure is not limited thereto.

A plurality of sub-pixels may constitute a single pixel. For example, R (red), W (white), G (green), and B (blue) sub-pixels neighboring in the first direction may constitute a single pixel. However, R, G, and B sub-pixels may constitute a single pixel. In this case, W sub-pixels may be omitted from the pixel array. R, W, G, and B sub-pixels have the same pixel circuit configuration although they have different luminescent materials forming light-emitting elements.

A sub-pixel may include a light-emitting element OLED, a driving TFT DT, switching TFTs ST1 and ST2, and a storage capacitor Cst, as shown in FIG. 3. The driving TFT DT and the switching TFTs ST1 and ST2 may be implemented as NMOSs, but the present disclosure is not limited thereto.

The light-emitting element OLED emits light with intensity corresponding to pixel current input from the driving TFT DT. The light-emitting element OLED may be implemented as an organic light-emitting diode including an organic emission layer or an inorganic light-emitting diode including an inorganic emission layer. An anode of the light-emitting element OLED is connected to a second node N2 and a cathode thereof is connected to an input terminal to which the low-level pixel voltage EVSS is applied.

The driving TFT DT is a driving element that generates pixel current corresponding to a gate-source voltage. A gate electrode of the driving TFT DT is connected to a first node N1, a first electrode (drain electrode) thereof is connected to an input terminal to which the high-level pixel voltage EVDD is applied, and a second electrode (source electrode) thereof is connected to the second node N2.

The switching TFTs ST1 and ST2 are switching elements that set the gate-source voltage of the driving TFT DT and connect the second electrode of the driving TFT DT to the readout lines RL.

The first switching TFT ST1 is connected between a data line DL and the first node N1 and is turned on according to the first gate signal SCAN from the first gate line GL1. The first switching TFT ST1 is turned on during programming in the display mode and the sensing mode. When the first switching TFT ST1 is turned on, a data voltage Vdata for display or sensing is applied to the first node N1. The gate electrode of the first switching TFT ST1 is connected to the first gate line GL1, the first electrode thereof is connected to the data line DL, and the second electrode thereof is connected to the first node N1.

The second switching TFT ST2 is connected between a readout line RL and the second node N2 and is turned on according to the second gate signal SEN from the second gate line GL2. The second switching TFT ST2 is turned on during programming in the display mode and the sensing mode to apply the reference voltage VREF to the second node N2. In addition, the second switching TFT ST2 is also turned on during a sensing operation after set-up in the sensing mode to transfer a source node voltage (or a source voltage) of the driving TFT DT to the readout line RL. Then, a sensing voltage Vsen corresponding to the source voltage is stored in a parasitic capacitor Cp of the readout line RL. The gate electrode of the second switching TFT ST2 is connected to the second gate line GL2, the first electrode thereof is connected to the readout line RL, and the second electrode thereof is connected to the second node N2.

The storage capacitor Cst is connected between the first node N1 and the second node N2 and maintains the gate-source voltage of the driving TFT DT for a predetermined time. The gate-source voltage of the driving TFT DT is programmed to a difference voltage between the data voltage Vdata for display and the reference voltage VREF in the display mode and is programmed to a difference voltage between the data voltage Vdata for sensing and the reference voltage VREF in the sensing mode.

In the display mode, pixel current corresponding to the gate-source voltage of the driving TFT DT flows through the driving TFT DT and thus the light-emitting element OLED emits light according to the pixel current. In the sensing mode, pixel current corresponding to the gate-source voltage of the driving TFT DT flows through the driving TFT DT and thus a source node voltage of the driving TFT DT changes according to the pixel current. Since the source node voltage changes according to driving characteristics of the driving TFT DT, change in the driving characteristics of the driving TFT DT may be detected through a sensing voltage Vsen corresponding to the source node voltage. Meanwhile, the low-level pixel voltage EVSS is applied as a voltage higher than the operating point voltage of the light-emitting element OLED in the sensing mode, and thus the pixel current of the driving TFT DT does not flow to the light-emitting element OLED and flows only through the readout line RL. Accordingly, sensing reliability can be improved because the source node voltage is reflected in the sensing voltage Vsen within a short time.

Such a sub-pixel configuration and operation are merely an example and thus the technical spirit of the present disclosure is not limited thereto. For example, the first and second gate signals SCAN and SEN may be unified and the first and second gate lines GL1 and GL2 may be unified. Further, the sub-pixel configuration may be modified to be suitable for double rate driving.

As shown in FIG. 4, each display unit does not individually include an application specific integrated circuit (ASIC). In addition, operations of the display units are controlled by a single timing controller TCON through bidirectional communication. Accordingly, a connection structure of the display units is simplified and an additional data processing operation for image synchronization is not required.

Referring to FIG. 4, the display units include a plurality of data drivers DIC connected through a bidirectional interface circuit. The timing controller TCON is mounted on a control printed circuit board C-PCB and is connected to the data drivers DIC through a bidirectional interface circuit. The bidirectional interface circuits may be connected through a bidirectional communication cable. In addition, the bidirectional interface circuits may be implemented as an embedded panel interface (EPI).

The data drivers DIC may be positioned on the backside of a display panel, as shown in FIG. 5. A source printed circuit board S-PCB is additionally positioned on the backside of the display unit. A conductive film COF in which the data driver DIC is mounted is bonded to the source printed circuit board S-PCB. The source printed circuit board S-PCB includes a first connection terminal CTX and a second connection terminal CRX to be connected to a bidirectional communication cable CBL, as shown in FIG. 6. Further, the control printed circuit board C-PCB also includes the first connection terminal CTX and the second connection terminal CRX to be connected to the bidirectional communication cable CBL. Accordingly, the timing controller TCON is electrically connected to the data drivers DIC, and a first interface signal (hereinafter, an EPI signal) in a first direction and a second interface signal (hereinafter, an EPI feedback signal) in a second direction that is the opposite direction to the first direction are transmitted and received between the data drivers DIC and the timing controller TCON electrically connected to it.

The data driver DIC includes a digital-to-analog converter DAC that generates a data voltage Vdata, a sensing circuit SENU, and an analog-to-digital converter ADC. The digital-to-analog converter DAC converts image data supplied from the timing controller TCON into the data voltage Vdata for display according to a timing control signal and then provides the data voltage Vdata to the data lines DL in the display mode. The digital-to-analog converter DAC generates the data voltage Vdata for sensing and then provides the data voltage Vdata for sensing to the data lines DL in the sensing mode.

The sensing circuit SENU provides the reference voltage VREF to the readout lines RL in the display mode. The sensing circuit SENU provides the reference voltage VREF to the readout lines RL and then samples a sensing voltage Vsen charged in the readout lines RL in the sensing mode. The sensing circuit SENU includes a reference voltage switch SPRE connected between the readout line RL and a reference voltage VREF input terminal, and a sampling switch SAM connected between the readout line RL and the analog-to-digital converter ADC. The reference voltage switch SPRE is turned on only in a programming period of the display mode and the sensing mode and the sampling switch SAM is turned on only in a sampling period of the sensing mode.

The analog-to-digital converter ADC performs digital processing on a sampling voltage generated when the sampling switch SAM is turned on to output sensing result data SDATA in the sensing mode. The sensing result data SDATA may be a signal representing a result of execution according to a driving command signal.

The gate driver may receive an operation voltage and a timing control signal through the data driver DIC. The gate driver may be embedded in a non-display area around the pixel array of the display panel. The gate driver generates the first and second gate signals SCAN and SEN according to the timing control signal and provides the first and second gate signals SCAN and SEN to the first and second gate lines GL1 and GL2. The first and second gate signals SCAN and SEN are used to select a pixel line in which the data voltage Vdata for display will be written in the display mode and used to select a sensing target pixel line in the sensing mode.

Here, a pixel line refers to a set of pixels and signal lines neighboring in the second direction.

Figure 7:
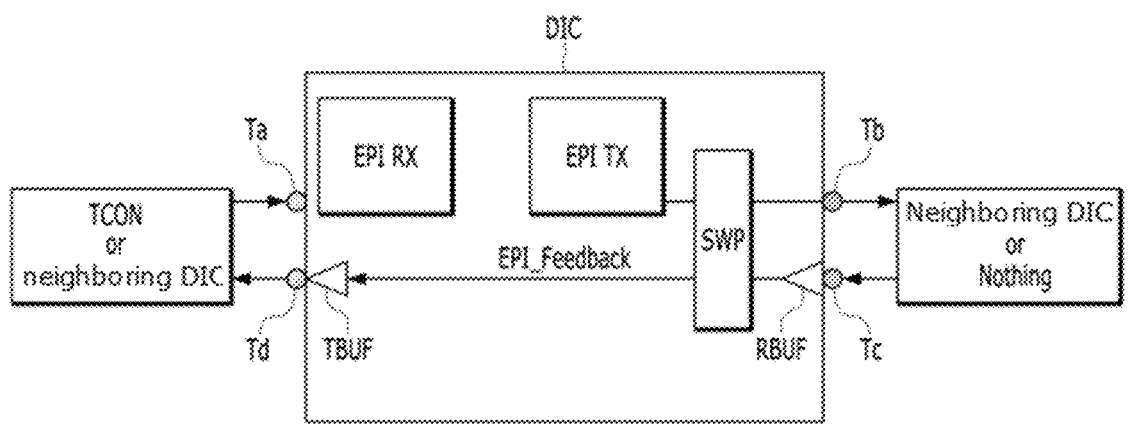
FIG. 7 is a diagram showing an internal configuration of a data driver for bidirectional communication.
Figure 8:
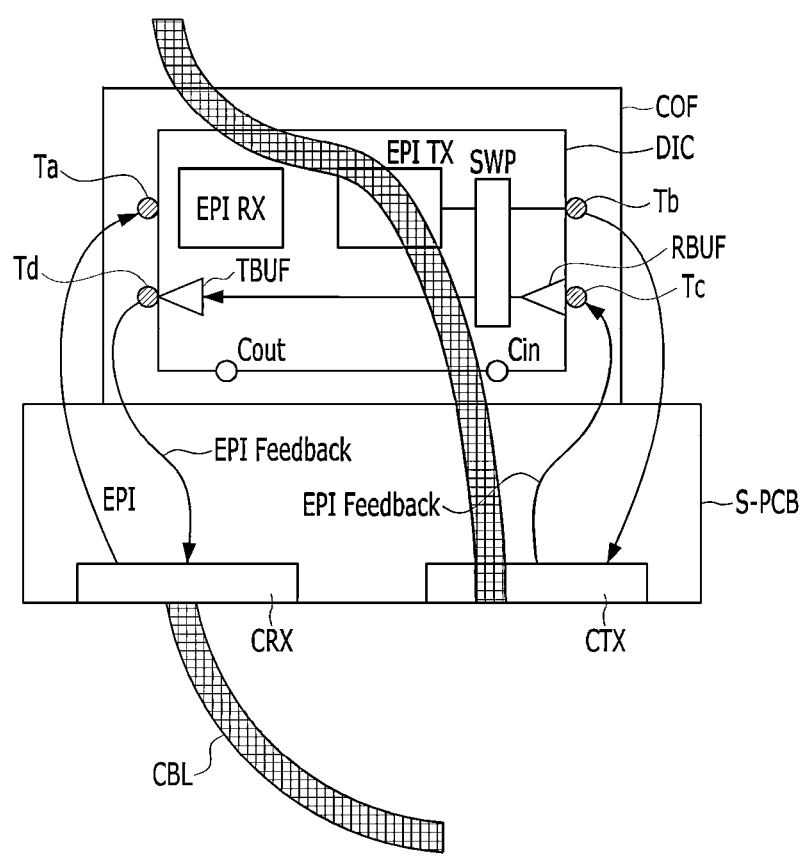
FIG. 8 is a diagram showing a configuration of connection between the data driver and the source printed circuit board for bidirectional communication.

FIG. 7 is a diagram showing an internal configuration of the data driver for bidirectional communication and FIG. 8 is a diagram showing a configuration of connection between the data driver and the source printed circuit board for bidirectional communication.

Referring to FIG. 7 and FIG. 8, each data driver DIC receives an EPI signal from the timing controller TCON or a preceding data driver DIC adjacent thereto and transfers the EPI signal to a following data driver DIC adjacent thereto. The EPI signal is transferred to the data drivers DIC connected through the bidirectional interface circuit. The EPI signal may include unit image data to be written in each display unit, a sensing command signal, an ID command signal, and the like.

Each data driver DIC receives an EPI feedback signal from the following data driver DIC adjacent thereto and transfers the EPI feedback signal to the preceding data driver DIC adjacent thereto. The EPI feedback signal is fed back from at least one data driver DIC to the timing controller TCON through the bidirectional interface circuit. The EPI feedback signal may include sensing result data SDATA corresponding to the sensing command signal, an ID allocation completion signal corresponding to the ID command signal, and the like.

Each data driver DIC may include a first reception circuit EPI RX, a first transmission circuit EPI TX, a second reception circuit RBUF, a second transmission circuit TBUF, and a switch circuit SWP.

The first reception circuit EPI RX receives an EPI signal from the timing controller TCON or a preceding data driver DIC adjacent thereto. The first transmission circuit EPI TX transmits the EPI signal to a following data driver DIC adjacent thereto. The second reception circuit RBUF receives an EPI feedback signal from the following driver DIC adjacent thereto. The second transmission circuit EPI TBUF transmits the EPI feedback signal to the preceding data driver DIC adjacent thereto. In addition, the switch circuit SWP is connected to the first transmission circuit EPI TX, the second transmission circuit TBUF, and the second reception circuit RBUF and switches to a bypass switching state or a feedback switching state according to switch set information included in the EPI signal. The bypass switching state and the feedback switching state differ from each other. Further, the second reception circuit RBUF and the second transmission circuit TBUF also serve to store the EPI feedback signal for a predetermined time and to remove noise to stabilize the signal.

The data driver DIC may further include a first signal terminal Ta connected to the first reception circuit EPI RX, a second signal terminal Tb connected to the first transmission circuit EPI TX, a third signal terminal Tc connected to the second reception circuit RBUF, and a fourth signal terminal Td connected to the second transmission circuit TBUF.

The first signal terminal Ta and the fourth signal terminal Td are connected to a first bidirectional communication cable CBL through a second connection terminal CRX of a source printed circuit board S-PCB. The first bidirectional communication cable CBL is connected to a first connection terminal CTX of a preceding source printed circuit board S-PCB.

The second signal terminal Tb and the third signal terminal Tc are connected to a second bidirectional communication cable CBL through the first connection terminal CTX of the source printed circuit board S-PCB. The second bidirectional communication cable CBL is connected to the second connection terminal CRX of a following source printed circuit board S-PCB.

According to the configuration of connection for bidirectional communication, as shown in FIG. 7 and FIG. 8, the advantage of simplifying the internal configuration of the data driver can be obtained because the EPI signal and the EPI feedback signal can be bidirectionally transmitted through the bidirectional communication cable CBL.

In FIG. 8, Cin and Cout represent connection checking terminals for checking connection between data drivers in a set mode for assigning identification numbers ID to display units. This will be described later in description of FIG. 10 to FIG. 12.

Figure 9:
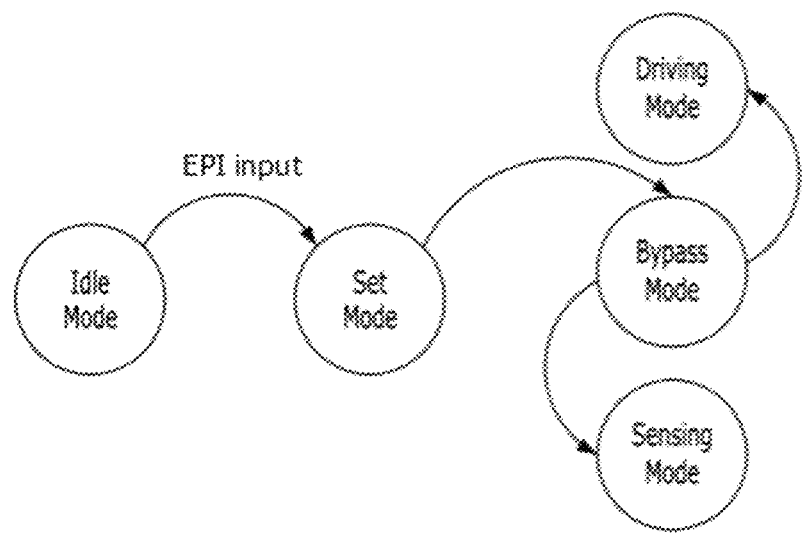
FIG. 9 is a diagram showing operation modes of the data driver.

FIG. 9 is a diagram showing operation modes of the data driver.

Referring to FIG. 9, the data driver may operate in any one of an idle mode, the set mode, a bypass mode, the display mode, and the sensing mode.

The idle mode is a driving mode corresponding to an initial state immediately after application of system power (or main driving power). The set mode is a driving mode for ID allocation (i.e., assignment identification numbers). The bypass mode is a driving mode for bypassing a received EPI signal or EPI feedback signal to the following data driver when the EPI signal or the EPI feedback signal does not match an allocated ID. The display mode is a driving mode for converting unit image data into a data voltage and applying the data voltage to the display panel when a received EPI signal matches the allocated ID. The sensing mode is a driving mode for sensing driving characteristics of pixels corresponding to a sensing command signal and generating sensing result data SDATA when a received EPI signal matches the allocated ID.

The switch circuit SWP included in the data driver switches to the bypass switching state (refer to "SW_SET=101" in FIG. 10) or switches to the feedback switching state (refer to "SW_SET=010" in FIG. 10) according to the set mode, the bypass mode, the display mode, or the sensing mode. In the idle mode, the switch circuit SWP switches to an initial switching state (for example, "SW_SET=000").

Figure 10:
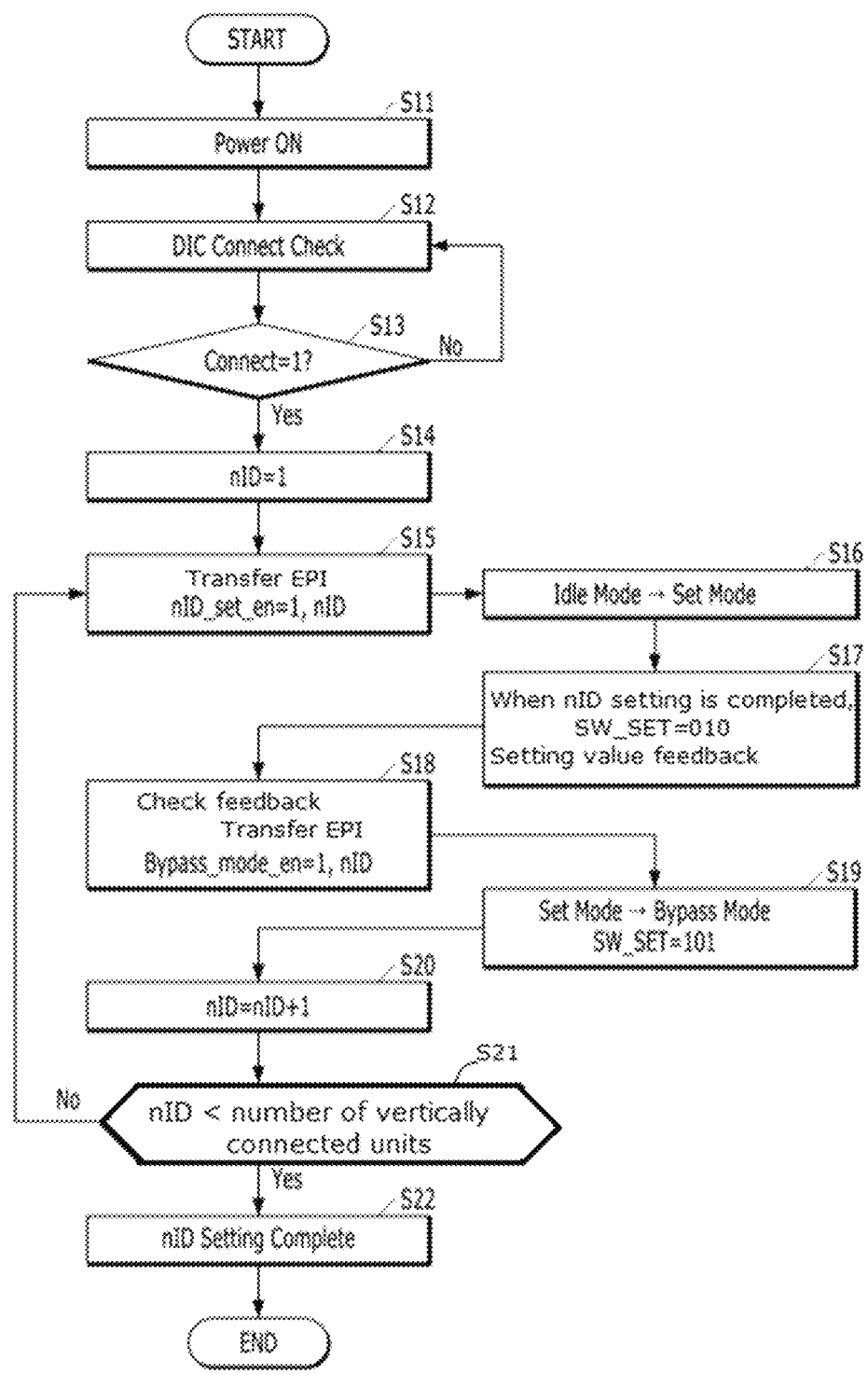
FIG. 10 to FIG. 12 are diagrams for describing a control procedure of the timing controller in a set mode of FIG. 9.
Figure 11:
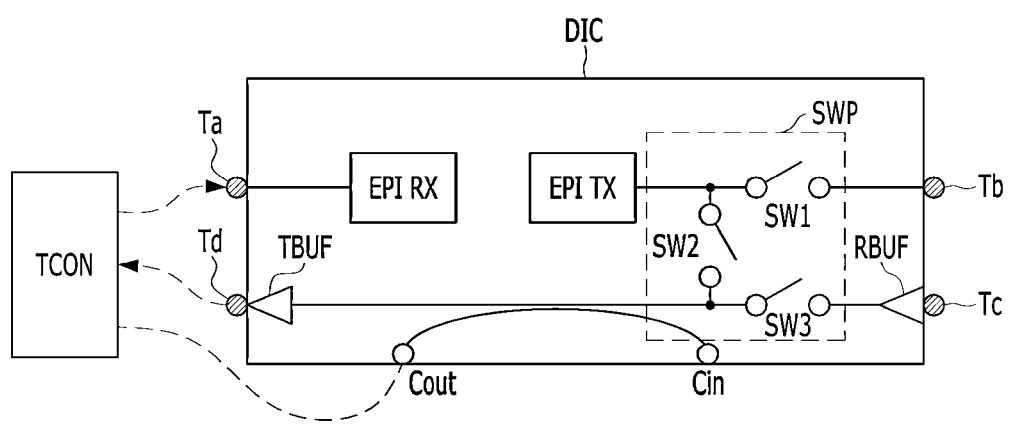
Figure 12:
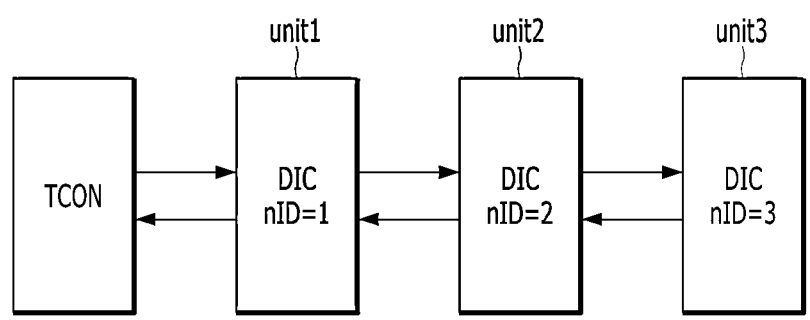

FIG. 10 to FIG. 12 are diagrams for describing a control procedure of the timing controller in the set mode of FIG. 9.

Referring to FIG. 10 to FIG. 12, when system power is applied, the timing controller TCON monitors the connection checking terminals Cin and Cout of the data driver DIC to check connection between data drivers to which IDs need to be allocated (S11 and S12).

Upon confirmation of connection between the data drivers, the timing controller TCON includes an ID set enable signal (i.e., ID command signal) in an EPI signal and transmits the EPI signal to a first data driver DIC1 to which ID=1 will be allocated (S13, S14, and S15).

The first data driver DIC1 switches from the idle mode to the set mode according to the ID command signal and sets ID=1. Then, the first data driver DIC1 switches the switch circuit SWP to the feedback switching state ("SW_SET=010") and feeds back an ID allocation completion signal to the timing controller TCON (S16 and S17).

The timing controller TCON checks the feedback signal, includes a bypass mode enable signal in the EPI signal and transmits the EPI signal to the first data driver DIC1 (S18).

The first data driver DIC1 switches from the set mode to the bypass mode according to the bypass mode enable signal and switches the switch circuit SWP to the bypass switching state ("SW_SET=101") (S19).

The timing controller TCON includes an ID command signal in an EPI signal and transmits the EPI signal to a second data driver DIC2 to which ID=2 will be allocated (S20). This ID command signal is transmitted to the second data driver DIC2 through the first data driver DIC1 in the bypass switching state ("SW_SET=101").

The second data driver DIC2 switches from the idle mode to the set mode according to the ID command signal and sets ID=2. Then, the second data driver DIC2 switches the switch circuit SWP to the feedback switching state ("SW_SET=010") and feeds back an ID allocation completion signal to the timing controller TCON. The ID allocation completion signal is fed back to the timing controller TCON through the first data driver DIC1 in the bypass switching state ("SW_SET=101").

The timing controller TCON checks the feedback signal, includes the bypass mode enable signal in the EPI signal and transmits the EPI signal to the second data driver DIC2. The bypass mode enable signal is transmitted to the second data driver DIC2 through the first data driver DIC1 in the bypass switching state ("SW_SET=101").

The second data driver DIC2 switches from the set mode to the bypass mode according to the bypass mode enable signal and switches the switch circuit SWP to the bypass switching state ("SW_SET=101").

In this manner, the timing controller TCON assigns IDs to data drivers DIC1 to DIC3 to which IDs need to be allocated, checks the ID allocation completion signal, and then switches the switch circuit SWP included in each of the data drivers DIC1 to DIC3 to the bypass switching state ("SW_SET=101") (S21 and S22).

Here, when the switch circuit SWP in the feedback switching state ("SW_SET=010") or the bypass switching state ("SW_SET=101") is used, the advantage of considerably reducing the number of cables necessary to signal transmission/feedback is obtained.

Referring to FIG. 11, the switch circuit SWP may include a first switch SW1 connected between the first transmission circuit EPI TX and the second signal terminal Tb, a second switch SW2 connected between the first transmission circuit EPI TX and the second transmission circuit TBUF, and a third switch SW3 connected between the second transmission circuit TBUF and the second reception circuit RBUF.

In this switch circuit SWP, the first switch SW1 and the third switch SW3 are turned on/off in the same manner and the second switch SW2 is turned on/off reversely to the first and third switches SW1 and SW3 to implement the feedback switching state ("SW_SET=010") and the bypass switching state ("SW_SET=101").

The feedback switching state ("SW_SET=010") and the bypass switching state ("SW_SET=101") are results of combinations of on/off states of the switches SW1, SW2, and SW3 included in the switch circuit SWP. The first switch SW1 and the third switch SW3 are turned on and the second switch SW2 is turned off in the bypass switching state ("SW_SET=101"). The first switch SW1 and the third switch SW3 are turned off and the second switch SW2 is turned on in the feedback switching state ("SW_SET=010").

The feedback switching state ("SW_SET=010") and the bypass switching state ("SW_SET=101") are determined according to switch set information. The switch set information may be included in control data in a data transmission packet constituting an EPI signal. Such switch set information may be independently set for each data driver.

The timing controller TCON may sequentially drive the display units in the set mode based on switch set information to assign different identification numbers (nID=1, 2, and 3) to the display units.

Figure 13:
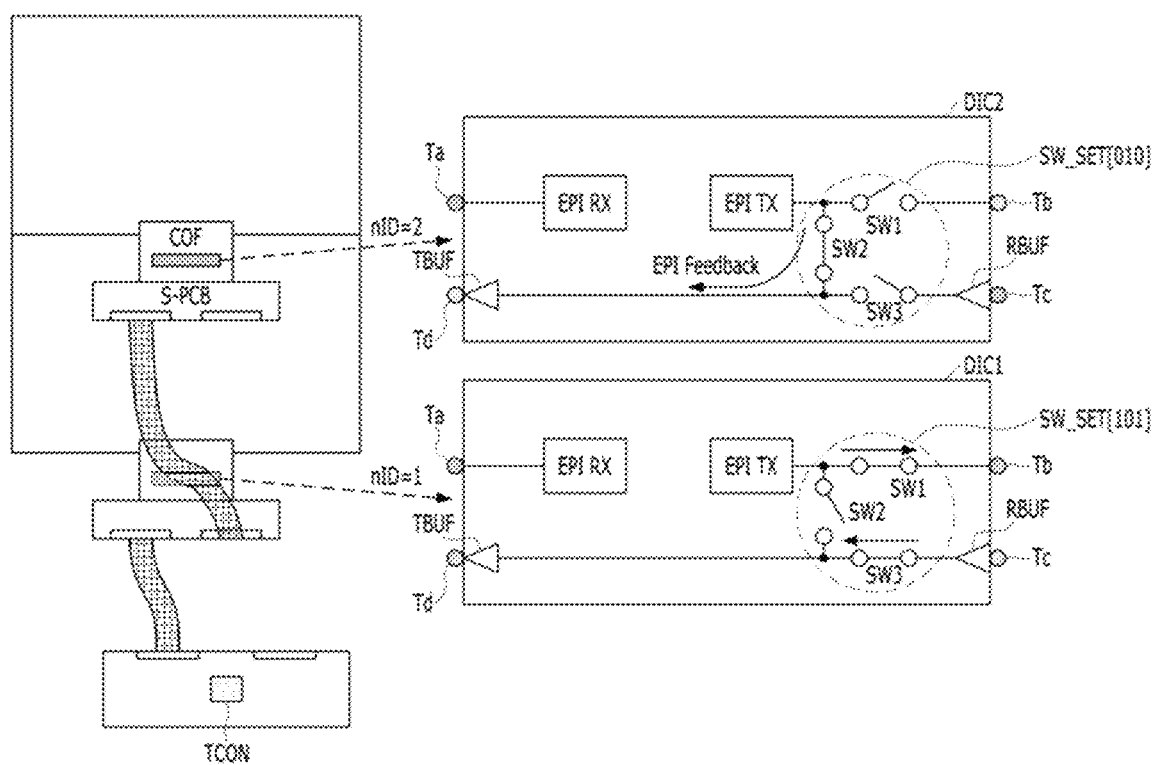
FIG. 13 and FIG. 14 are diagrams showing change in set states of switches included in data drivers according to operation modes of the data driver.
Figure 14:
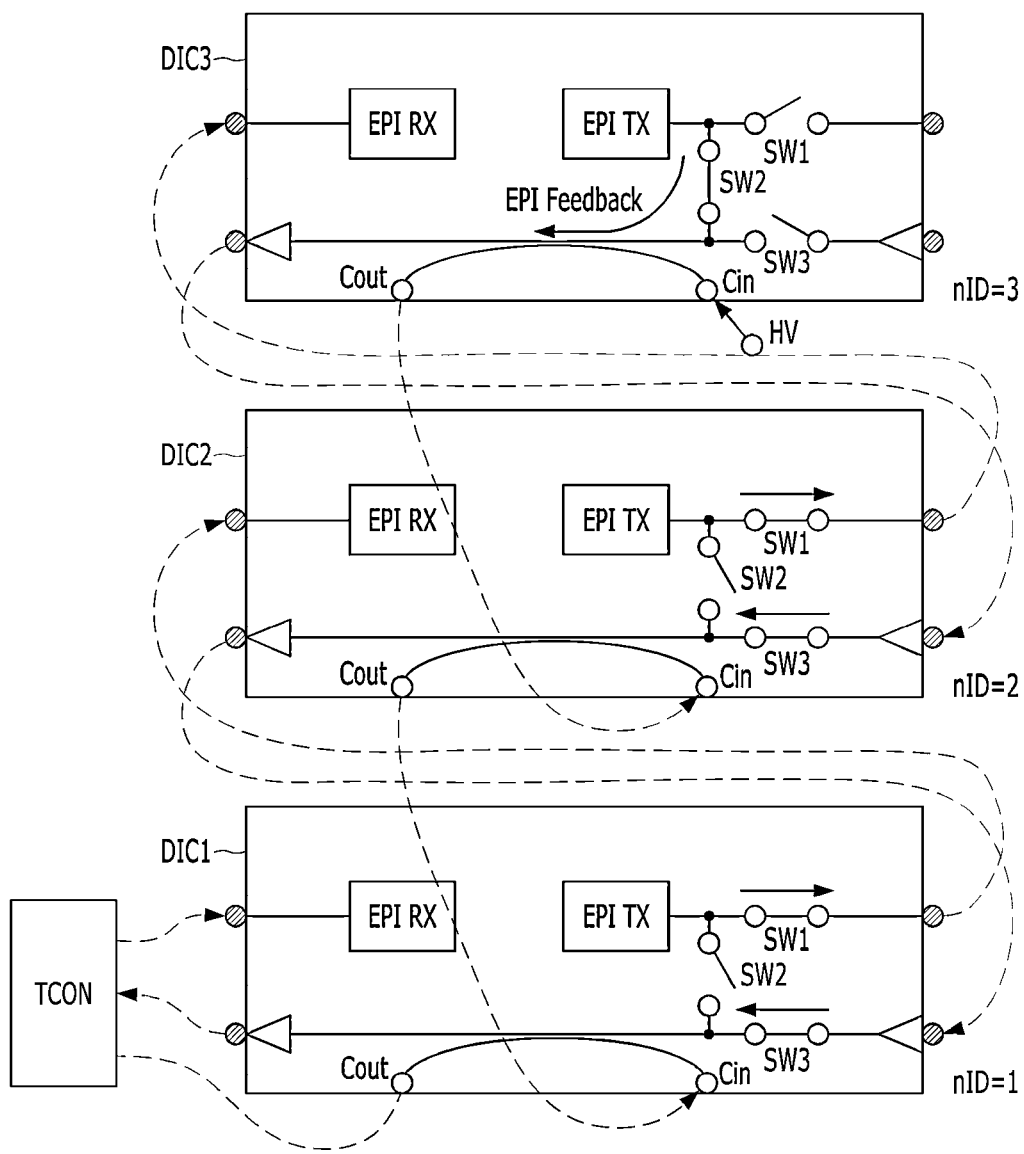

FIG. 13 and FIG. 14 are diagrams showing change in set states of switches included in data drivers according to operation modes of the data driver.

Referring to FIG. 13, when the second data driver DIC2 operates in the set mode or the sensing mode, the switch circuit SWP of the second data driver DIC2 switches to the feedback switching state ("SW_SET=010") and the switch circuit SWP of the first data driver DIC1 switches to the bypass switching state ("SW_SET=101"). In the feedback switching state, SW1=0 (off), SW2=1 (on), and SW3=0 (off). In the bypass switching state, SW1=0 (on), SW2=1 (off), and SW3=0 (on). Here, the first data driver DIC1 may operate in the display mode or the bypass mode according to an EPI signal.

Referring to FIG. 14, when the third data driver DIC3 operates in the set mode or the sensing mode, the switch circuit SWP of the third data driver DIC3 switches to the feedback switching state ("SW_SET=010") and the switch circuits SWP of the first and second data drivers DIC1 and DIC2 switch to the bypass switching state ("SW_SET=101"). In the feedback switching state, SW1=0 (off), SW2=1 (on), and SW3=0 (off). In the bypass switching state, SW1=0 (on), SW2=1 (off), and SW3=0 (on). Here, the first and second data drivers DIC1 and DIC2 may operate in the display mode or the bypass mode according to an EPI signal.

Meanwhile, a high-level checking voltage HV is applied to the connection checking terminal Cin of the third data driver DIC3. The high-level checking voltage HV is transferred to the timing controller TCON through the connection checking terminals Cin and Cout of the data drivers DIC1 and DIC2. The timing controller TCON may determine whether the data drivers DIC1, DIC2, and DIC3 are normally connected by checking the high-level checking voltage HV.

Figure 15:
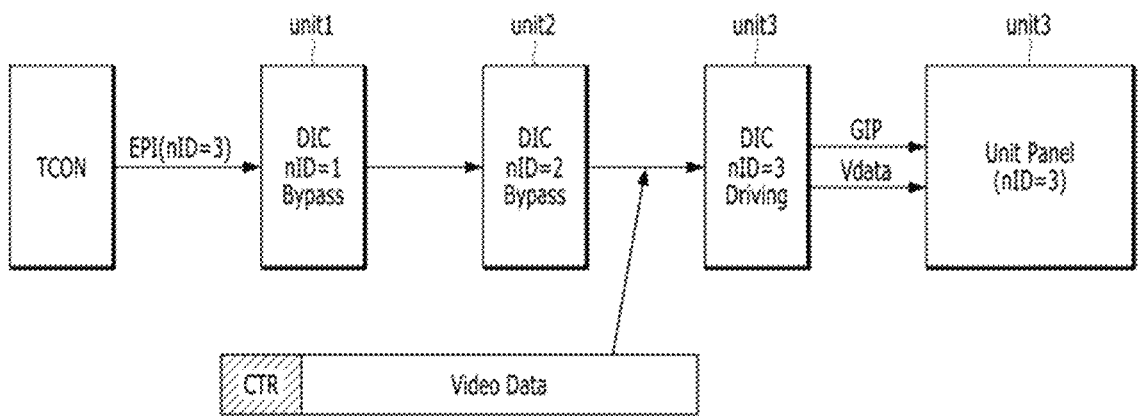
FIG. 15 is a diagram showing an example of realizing a bypass mode and a display mode according to control data of a data transmission packet.

FIG. 15 is a diagram showing an example of realizing the bypass mode and the display mode according to control data of a data transmission packet.

Referring to FIG. 15, a data transmission packet transmitted from the timing controller TCON to the data driver DIC of each display unit includes control data CTR along with unit image data. The control data CTR includes ID information, gate timing information GIP, and the like.

The data driver DIC of each display unit determines if the ID information included in the control data CTR corresponds thereto by analyzing the ID information. The data driver DIC of each display unit operates in the display mode only when the ID information corresponds thereto and operates in the bypass mode if not. For example, when the ID information indicates the third data driver DIC3, the first and second data drivers DIC1 and DIC2 bypass the EPI signal (i.e., the data transmission packet) from the timing controller TCON such that the EPI signal is transferred to the third data driver DIC3. The third data driver DIC3 converts the unit image data into a data voltage Vdata and writes the data voltage Vdata into the corresponding display panel in association with the gate timing information GIP.

Figure 16:
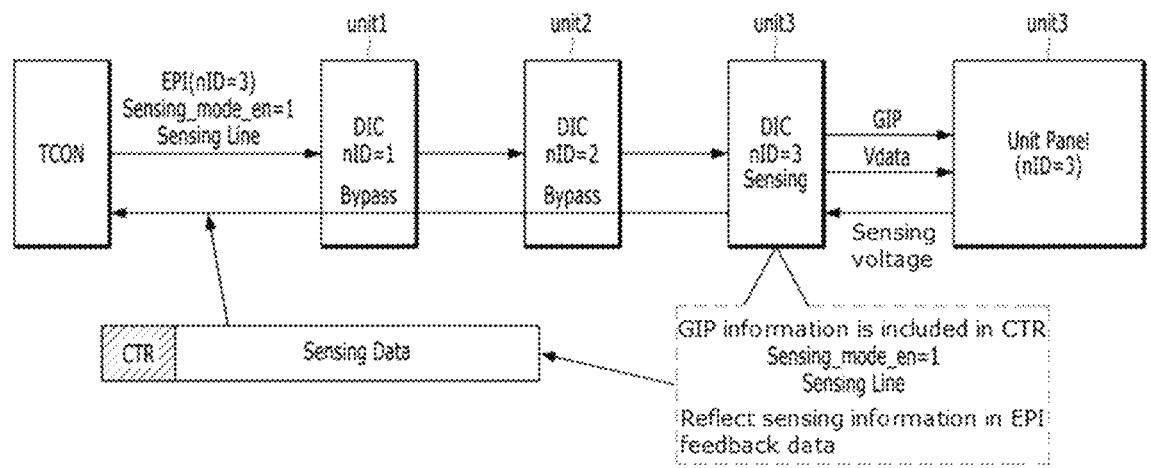
FIG. 16 and FIG. 17 are diagrams showing an example of realizing the bypass mode and a sensing mode according to control data of a data transmission packet.
Figure 17:
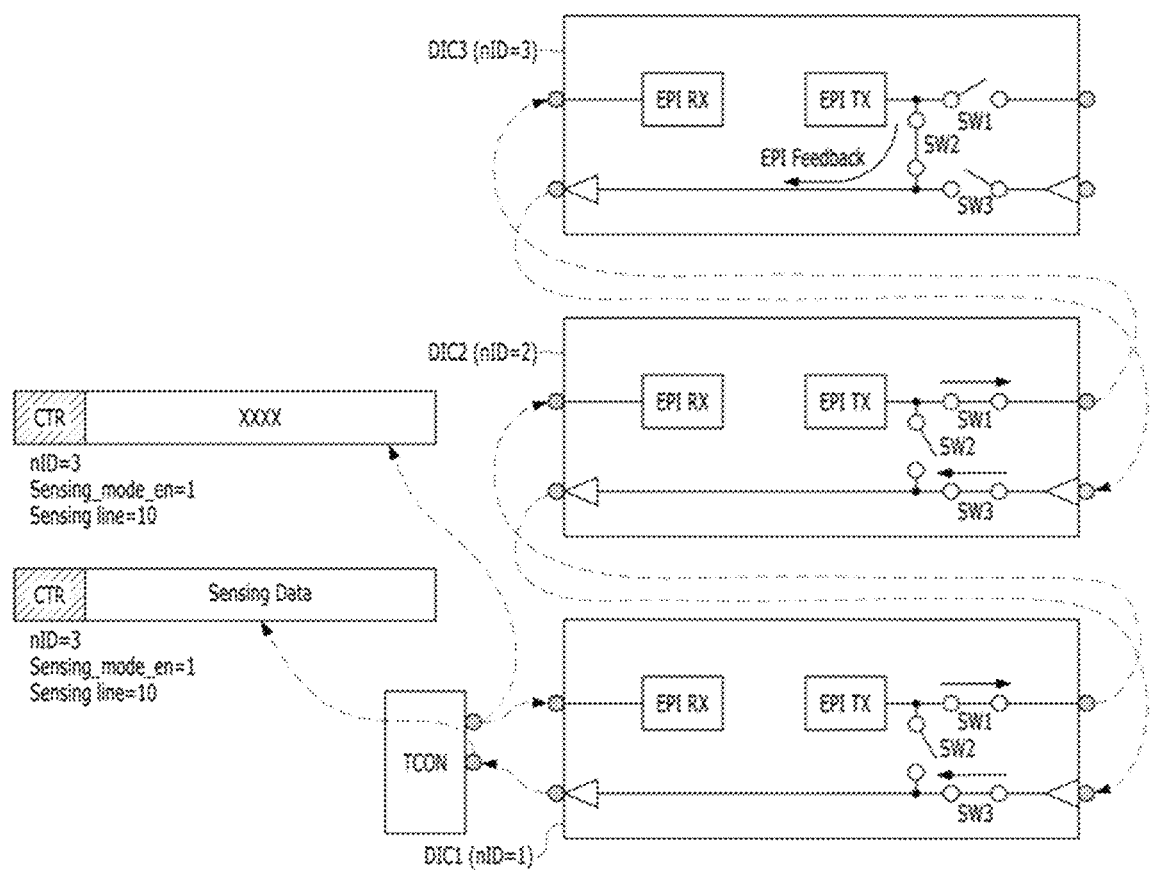

FIG. 16 and FIG. 17 are diagrams showing an example of realizing the bypass mode and the sensing mode according to control data of a data transmission packet.

Referring to FIG. 16 and FIG. 17, a data transmission packet transmitted from timing controller TCON to the data driver DIC of each display unit includes control data CTR along with unit image data. The control data CTR further includes a sensing enable signal and a target sensing line signal in addition to ID information and gate timing information GIP.

The data driver DIC of each display unit determines if the ID information included in the control data CTR corresponds thereto by analyzing the ID information. The data driver DIC of each display unit operates in the display mode or the sensing mode only when the ID information corresponds thereto and operates in the bypass mode if not. For example, when the ID information indicates the third data driver DIC3, the first and second data drivers DIC1 and DIC2 bypass the EPI signal (i.e., the data transmission packet) from the timing controller TCON such that the EPI signal is transferred to the third data driver DIC3. The third data driver DIC3 converts the unit image data into a data voltage Vdata and applies the data voltage Vdata to the corresponding display panel in association with the gate timing information GIP. In addition, the third data driver DIC3 senses driving characteristics of pixels corresponding to a target sensing line to obtain sensing result data and then feeds back a data transmission packet including this sensing result data to the timing controller TCON. The data transmission packet including the sensing result data becomes an EPI feedback signal. The EPI feedback signal is fed back to the timing controller TCON via the first and second data drivers DIC1 and DIC2.

The present embodiment has the following advantages.

According to the infinitely expandable display device according to embodiments of the present disclosure, operations of display units are controlled by the timing controller through bidirectional communication. The timing controller can control the data driver of each display unit to switch to the feedback switching state or the bypass switching state using set information included in an EPI signal. Since each data driver can bidirectionally transmit an EPI signal and an EPI feedback signal through a bidirectional communication cable, a connection structure of display units is simplified and an additional data processing operation for image synchronization is not required.

It will be appreciated by persons skilled in the art that the effects that can be achieved with the present disclosure are not limited to what has been particularly described hereinabove and other advantages of the present disclosure will be more clearly understood from the following detailed description.

It will be apparent to those skilled in the art that various modifications and variations can be made in the infinitely expandable display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. An infinitely expandable display device, comprising:
a plurality of display units including a plurality of data drivers connected through a bidirectional interface circuit; and
a timing controller commonly connected to the display units through the bidirectional interface circuit,
wherein each of the data drivers includes:
a first reception circuit configured to receive a first interface signal in a first direction;
a first transmission circuit configured to transmit the first interface signal in the first direction;
a second reception circuit configured to receive a second interface signal in a second direction opposite the first direction;
a second transmission circuit configured to transmit the second interface signal in the second direction; and
a switch circuit connected to the first transmission circuit, the second transmission circuit, and the second reception circuit.

2. The infinitely expandable display device of claim 1, wherein each of the data drivers includes:
a first signal terminal connected to the first reception circuit;
a second signal terminal connected to the first transmission circuit;
a third signal terminal connected to the second reception circuit; and
a fourth signal terminal connected to the second transmission circuit.

3. The infinitely expandable display device of claim 2, wherein the switch circuit includes:
a first switch connected between the first transmission circuit and the second signal terminal;
a second switch connected between the first transmission circuit and the second transmission circuit; and
a third switch connected between the second transmission circuit and the second reception circuit.

4. The infinitely expandable display device of claim 3, wherein the first switch and the third switch are turned on/off in the same manner and the second switch is turned on/off reversely to the first and third switches.

5. The infinitely expandable display device of claim 3, wherein the first switch and the third switch are turned off and the second switch is turned on in a feedback switching state, and the first switch and the third switch are turned on and the second switch is turned off in a bypass switching state.

6. The infinitely expandable display device of claim 5, wherein the bypass switching state or the feedback switching state is determined according to switch set information, and the switch set information is included in control data in a data transmission packet constituting the first interface signal in the first direction.

7. The infinitely expandable display device of claim 6, wherein the switch set information is independently set for each of the data drivers.

8. The infinitely expandable display device of claim 6, wherein the timing controller sequentially drives the display units in a set mode based on the switch set information to assign different identification numbers to the display units.

9. The infinitely expandable display device of claim 6, wherein the timing controller drives at least any one of the display units in a sensing mode based on the switch set information to obtain sensing information of a corresponding pixel line.

10. The infinitely expandable display device of claim 9, wherein the sensing information of the corresponding pixel line is included in a data transmission packet constituting the second interface signal in the second direction and fed back to the timing controller.

11. The infinitely expandable display device of claim 1, wherein the bidirectional interface circuit is connected through a bidirectional communication cable.

12. The infinitely expandable display device of claim 1, wherein the first interface signal in the first direction and the second interface signal in the second direction are implemented by an embedded panel interface (EPI).

13. The infinitely expandable display device of claim 12, wherein the first interface signal in the first direction is an EPI signal including unit image data to be written into each display unit, a sensing command signal, and an ID command signal, and the second interface signal in the second direction is an EPI feedback signal including sensing result data corresponding to the sensing command signal, and an ID setting completion signal corresponding to the ID command signal.

\* \* \* \* \*